Oct. 24, 1961 D. E. WIEGAND 3,005,878

FEEDBACK FOR A FLUX GATE REPRODUCING SYSTEM

Filed Aug. 16, 1955

Inventor
DAVID E. WIEGAND

By Hill, Sherman, Meroni, Gross & Simpson Attys 3,005,878

FEEDBACK FOR A FLUX GATE REPRODUCING SYSTEM

David E. Wiegand, Villa Park, Ill., assignor to Armour Research Foundation of Illinois Institute of Technology, Chicago, Ill., a corporation of Illinois Filed Aug. 16, 1955, Ser. No. 528,696
11 Claims. (Cl. 179—100.2)

This invention relates to a magnetic playback system and method, and is particularly directed to such a system and method operating on the magnetic modulator principle.

It is an object of the present invention to provide a novel playback system whereby non-linearity in a magnetic modulator head can be reduced to practically zero.

Another object of the present invention is to provide a magnetic playback system having improved high frequency response.

It is a further object of the present invention to provide a magnetic modulator playback system allowing saturating strips of smaller cross section for improved signal to noise ratio.

It is still another object of the present invention to provide a magnetic modulator playback system which allows the use of larger cross section saturating strips for a given signal to noise ratio.

Figure 1:
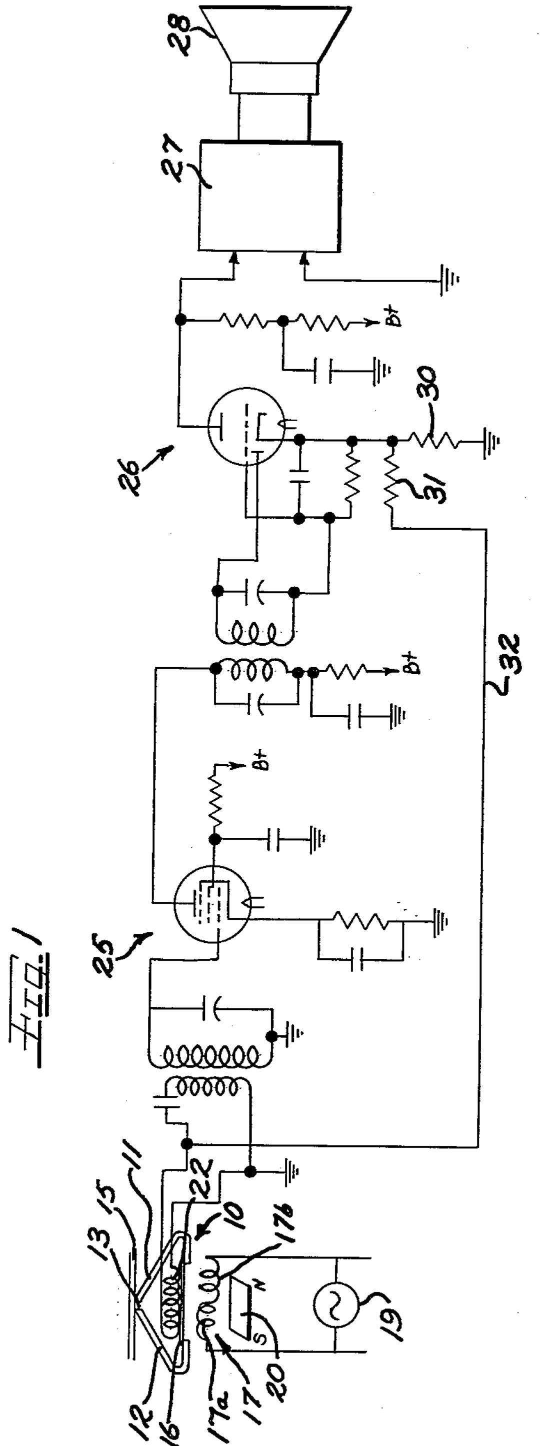
Figure 2:
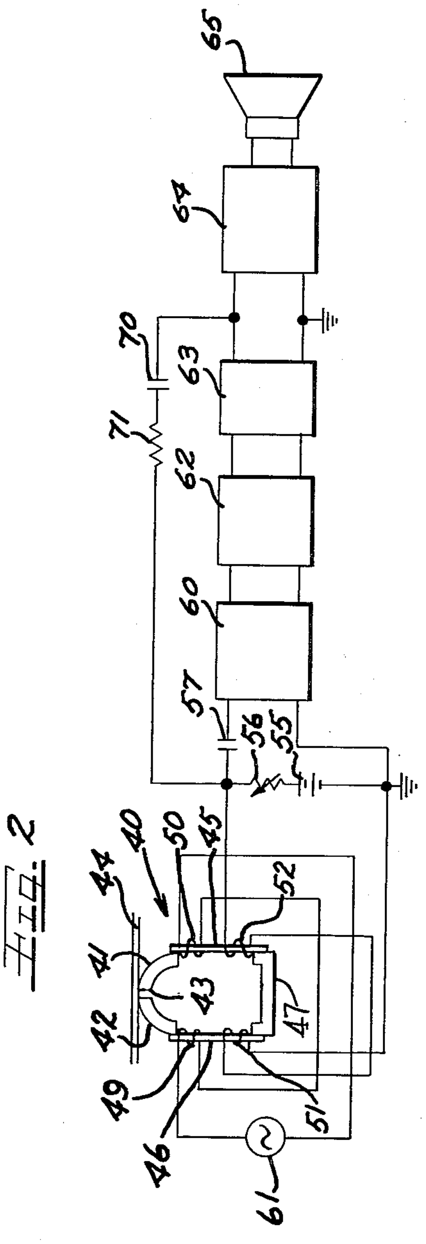

Other objects, features and advantages of the present invention will be apparent from the following detailed description taken in conjunction with the accompanying drawings, in which:

FIGURE 1 is a digrammatic view illustrating a magnetic modulator playback system in accordance with the present invention; and FIGURE 2 is a diagrammatic view illustrating a further magnetic playback system in accordance with the present invention.

As shown on the drawings:

Referring to FIGURE 1, there is illustrated a magnetic modulator head 10 comprising a pair of confronting pole pieces 11 and 12 defining a non-magnetic gap 13 for receiving a record medium 15 thereacross.

In accordance with the teachings of my copending application Serial No. 492,013, filed March 3, 1955, the head 10 includes a reduced cross section saturating strip 16 completing a loop magnetic circuit with the pole pieces 11 and 12 and having an exciting winding 17 thereon wound partly in one direction as indicated at *17a* and partly in the opposite direction as indicated at *17b* to generate opposed exciting fluxes in the saturating strip 16 when energized from an oscillator 19. Suitable means such as the permanent magnet 20 may be provided for introducing a constant bias flux in the saturating strip which is preferably greater than the maximum signal flux introduced into the core from the record medium 15 together with any feedback flux introduced as hereinafter described.

A pick-up winding 22 is suitably inductively coupled to the core of the head 10 as by being wrapped about the saturating strip 16 on top of the winding 17. In the absence of polarizing flux or signal flux in the core, the winding 17 is preferably so balanced with respect to the winding 22 that substantially no net voltage is induced in the winding 22. However, with polarizing flux and signal flux in the core, an even order harmonic amplitude modulated voltage will be induced in the winding 22 which will be proportionate to the signal flux introduced at the gap 13 by the record medium 15. By way of example, if the oscillator 19 is tuned to 228 kilocycles per second, the output from the coil 22 may be delivered to a suitable IF amplifier tuned to 456 kilocycles per second as indicated at 25 and then to a suitable diode detector and audio frequency amplifier 26. The output from this stage may be delivered to a suitable power amplifier or phase inverter and power amplifier stage 27 so as to drive suitable device 28 such as a loud-speaker.

In accordance with the present invention, a portion of the detected signal appearing across the resistor 30 is fed back to the pick-up winding 22 through a resistor 31 and feedback lead 32. The permanent magnet 20 is preferably oriented so that the magnetomotive force of the magnet opposes the M.M.F. of the D.C. component of the feedback current. Negative feedback results if the magnet strength is less than the net magnetomotive force applied to the saturating strip due to the signal from the tape and the feedback signal. Negative feedback also results if the magnet is omitted. Positive feedback results if the magnet strength is greater than the magnetomotive force applied to the saturating strip due to the tape and feedback signals.

It is found that negative feedback reduces the variation in signal flux in the saturating strip and thus allows use of a smaller saturating strip with resulting improvement in the signal to noise ratio. Positive feedback increases the variation of signal flux in the saturating strip and thus allows use of a larger cross section of saturating strip with resulting convenience of manufacture and improved sensitivity without a prohibitive decrease in the signal to noise ratio. This is an important advantage for narrow track record media where the signal introduced into the core from the record medium will necessarily be relatively small and ordinarily requires a very small cross section saturating strip.

With negative feedback, it is found that any non-linearity in the modulator head action which would create harmonic distortion in the output signal can be reduced to practically zero by using sufficient negative feedback to the head. Relative high frequency response is improved in several ways. The losses of high frequency components in the recorded signal due to limited band pass properties of the tuned IF transformers and due to eddy-current losses in the head structure are automatically compensated for by using sufficient negative feedback to the head. High frequency losses in the detector or first audio amplifier also are compensated for by the negative feedback. As a consequence of the use of negative feedback, it is found that the response of a system which without feedback would begin to fall off at one kilocycle per second is flat to 10 kilocycles per second with negative feedback.

FIGURE 2 illustrates a magnetic modulator head 40 including pole pieces 41 and 42 defining a non-magnetic gap 43 for receiving a record medium 44 thereacross. Saturating strips 45 and 46 and core member 47 complete a loop magnetic circuit with the pole pieces 41 and 42. The exciting windings are wound on the saturating strips 45 and 46 so as to produce high frequency fluxes in the core which are opposed with respect to the gap 43. Pick-up windings 51 and 52 are bifilar wound with the exciting windings 49 and 50 but are connected in aiding relation with respect to the loop magnetic circuit so as to produce a zero net output in the absence of polarizing or signal flux in the core. Polarizing flux may be introduced by means of a battery 55 and variable resistor 56 connected across the winding 51 and 52, and the output may be taken by means of a coupling capacitance 57 connected to a tuned amplifier 60 tuned to the second harmonic of the oscillator 61 for the exciting windings 49 and 50. The output of the amplifier may be fed to a detector 62, a further stage of amplification 63, a power amplifier 64 and a suitable output device 65 such as a loud speaker. Feedback is illustrated as being taken at the output of a stage of amplification 63 by means of a capacitance 70 and resistance 71 coupled to the signal windings 51 and 52. With one polarity of the battery 55, the feedback will be negative providing the polarizing flux exceeds the signal and feedback flux while with the other polarity of the battery, the feedback will be positive since the feedback flux aids the polarizing flux. With positive feedback, and for a given signal-to-noise ratio, the maximum permissible area of the saturating strip is increased, while with negative feedback, the maximum permissible cross section is reduced. With a sufficiently high negative feedback factor, all the distortion and gain variations, except those in the tape recording itself and effects due to varying degree of contact between the tape and playback head, can be reduced to negligibly small values. It was found that with the proper value of feedback components, the net output signal from a constant level recording on the tape was essentially unchanged in spite of artificially produced large changes in the gain of the amplifier.

It will be apparent that many modifications and variations may be effected without departing from the scope of the novel concepts of the present invention.

I claim as my invention:

1. A magnetic playback system comprising a magnetic core having a non-magnetic gap for receiving a magnetic record medium, means for establishing a rapidly fluctuating exciting flux in said core, output means inductively coupled to said core for deriving an amplitude modulated output signal from said core dependent upon the signal flux recorded on the portion of the record medium at said gap, detector means connected to said output means for demodulating said output signal, and means connected to said detector means for establishing a feedback flux in said core of amplitude dependent upon the amplitude of said output signal.

2. A magnetic playback system comprising a magnetic core having a non-magnetic gap for receiving a magnetic record medium, means for establishing a rapidly fluctuating exciting flux in said core, output means inductively coupled to said core for deriving an amplitude modulated output signal from said core dependent upon the signal flux recorded on the portion of the record medium at said gap, detector means connected to said output means for demodulating said output signal, and means connected to said detector means for establishing a feedback flux in said core of amplitude dependent upon the amplitude of said output signal, and means exerting a D.C. bias magnetomotive force on said core to cause the envelope of the amplitude modulated output signal to vary in accordance with the signal on said record medium.

3. A magnetic playback system comprising a magnetic core having a non-magnetic gap and a reduced cross section saturating portion, means for establishing opposed rapidly fluctuating exciting fluxes in said reduced cross section saturating portion of said core, output winding means inductively coupled to said core for deriving an amplitude modulated output signal from said core dependent upon a signal flux introduced at said gap, detector means connected to said output means for demodulating said output signal, and means connected to said detector means and to said output winding means for feeding a portion of the demodulated output signal back into said output winding means for establishing a feedback flux in said core of amplitude dependent upon the amplitude of said demodulated output signal.

4. Apparatus for reproducing a signal magnetically recorded on a record member which comprises magnetic core means for coupling to the record member to receive a magnetic signal flux therefrom varying in accordance with the signal recorded on the record member, exciting means coupled to said magnetic core means for establishing a rapidly fluctuating exciting flux in said magnetic core means, output means coupled to said magnetic core means for producing a modulated output signal in accordance with the net flux variation in said magnetic core means, demodulating means connected with said output means for demodulating said modulated output signal to provide a demodulated output signal, and feedback means coupled to said demodulating means and to said magnetic core means for establishing a feedback magnetic flux in said magnetic core means varying in accordance with said demodulated output signal.

5. A magnetic playback system comprising a magnetic core having a non-magnetic gap for receiving a magnetic record medium, means for establishing a rapidly fluctuating exciting flux in said core, output means inductively coupled to said core for deriving an amplitude modulated output signal from said core dependent upon the signal flux recorded on the portion of the record medium at said gap, amplifier means connected to said output means for amplifying the output signal, detector means connected to the amplifier means for demodulating the amplified output signal, and means connected to said detector means for establishing a feedback flux in said core of amplitude dependent upon the amplitude of said output signal.

6. The system of claim 1, wherein said core has a reduced cross section saturating strip, and said feedback means establishes said feedback flux directly in said saturating strip.

7. The system of claim 6, wherein said feedback means tends to produce a feedback flux in aiding relation to the signal flux in said saturating strip.

8. The system of claim 6, wherein said output means comprises a winding encircling said saturating strip, and said feedback means energizes said winding to establish a feedback flux in said saturating strip which in turn modulates said exciting flux.

9. The system of claim 6, wherein said feedback flux is introduced into said saturating strip by means of a winding encircling said saturating strip.

10. The system of claim 1, wherein a D.C. bias flux is introduced into said core in opposition to the D.C. component of the feedback flux.

11. The system of claim 1, wherein a tuned amplifier tuned to a harmonic of the frequency of the exciting flux is interposed between said output means and said detector means.

References Cited in the file of this patent

UNITED STATES PATENTS

| | | |
|---|---|---|
| 2,186,958 | Collins | Jan. 16, 1940 |
| 2,568,797 | Eland | Sept. 25, 1951 |
| 2,702,316 | Friend | Feb. 15, 1955 |
| 2,722,569 | Loper | Nov. 1, 1955 |
| 2,822,533 | Duinker et al. | Feb. 4, 1958 |
| 2,868,890 | Camras | Jan. 13, 1959 |
| 2,870,267 | Duinker et al. | Jan. 20, 1959 |